(12) United States Patent
Gerl et al.

(10) Patent No.: US 11,014,055 B2
(45) Date of Patent: May 25, 2021

(54) METHOD FOR GRANULATING OR AGGLOMERATING AND TOOL THEREFOR

(75) Inventors: Stefan Gerl, Werbach (DE); Christina Klein, Hardheim (DE)

(73) Assignee: Maschinenfabrik Gustav Eirich GmbH & Co KG, Hardheim (DE)

( * ) Notice: Subject to any disclaimer, the term of this patent is extended or adjusted under 35 U.S.C. 154(b) by 1090 days.

(21) Appl. No.: 14/004,700

(22) PCT Filed: Mar. 13, 2012

(86) PCT No.: PCT/EP2012/054351
§ 371 (c)(1),
(2), (4) Date: Sep. 12, 2013

(87) PCT Pub. No.: WO2012/123441
PCT Pub. Date: Sep. 20, 2012

(65) Prior Publication Data
US 2014/0003189 A1 Jan. 2, 2014

(30) Foreign Application Priority Data
Mar. 14, 2011 (DE) ...................... 10 2011 005 519.3

(51) Int. Cl.
*B01F 7/00* (2006.01)
*B01J 2/12* (2006.01)
(Continued)

(52) U.S. Cl.
CPC ........ *B01F 7/0045* (2013.01); *B01F 7/00025* (2013.01); *B01F 7/00125* (2013.01);
(Continued)

(58) Field of Classification Search
CPC ..... B29B 9/00; B29B 9/08; B29B 9/10; B01F 7/00025; B01F 7/0045; B01F 7/00466; B01J 2/12; B01J 2/14; B01J 2/10
(Continued)

(56) References Cited

U.S. PATENT DOCUMENTS 1,483,551 A * 2/1924 Mosher ............... B01F 7/00025
366/300
3,044,750 A * 7/1962 Schmitt, Jr. ......... B01F 7/00475
366/316
(Continued)

FOREIGN PATENT DOCUMENTS

DE        25 11 381 A1    9/1976
DE  10 2007 021056 A1   11/2008
(Continued)

OTHER PUBLICATIONS

The State Intellectual Property Office of the People's Republic of China, First Office Action, Chinese Patent Application 201280010667.9, Sep. 23, 2014, and English translation.
(Continued)

*Primary Examiner* — Elizabeth Insler
(74) *Attorney, Agent, or Firm* — Paul & Paul

(57) ABSTRACT

The present invention relates to a granulating and/or agglomerating tool for a granulating and/or agglomerating device with a fastening shaft and a substantially disk-shaped element with a diameter d which is fastened thereto and has an upper surface, a lower surface and a circumferential surface connecting the upper and the lower surface. In order to provide a granulating and/or agglomerating tool for a granulating and/or agglomerating device and a corresponding granulating and/or agglomerating device and a method for granulating or agglomerating with which the desired granulating or agglomerating result can be obtained very much faster and above all with a significantly finer granulated material with a significantly higher yield in the range of from 0.1 to 0.8 mm, it is proposed according to the invention that the circumferential surface exhibits a plurality of essentially V-shaped grooves running parallel to the axis of the shaft.

19 Claims, 10 Drawing Sheets

(51) Int. Cl.
  *B01J 2/10* (2006.01)
  *B01F 9/08* (2006.01)
(52) U.S. Cl.
  CPC ...... *B01F 7/00258* (2013.01); *B01F 7/00466* (2013.01); *B01F 9/08* (2013.01); *B01J 2/10* (2013.01); *B01J 2/12* (2013.01)
(58) Field of Classification Search
  USPC .................................................. 366/316, 224
  See application file for complete search history.

(56) References Cited

U.S. PATENT DOCUMENTS

| | | | | |
|---|---|---|---|---|
| 3,351,434 | A | | 11/1967 | Grimes et al. |
| 3,746,467 | A | * | 7/1973 | Buse ................... F04D 29/2288 416/186 R |
| 4,534,657 | A | * | 8/1985 | Clement ............... B01F 7/0045 241/46.17 |
| 5,501,524 | A | * | 3/1996 | Zuidema ............ B01F 7/00758 366/304 |
| 5,620,251 | A | * | 4/1997 | Funder ....................... B01J 2/12 366/144 |
| 6,832,738 | B2 | * | 12/2004 | Wessling ................ B29B 9/065 241/294 |
| 7,473,025 | B1 | | 1/2009 | Howk |
| 2005/0257644 | A1 | * | 11/2005 | Nakai ....................... C21B 3/04 75/315 |
| 2010/0118643 | A1 | | 5/2010 | Keller |

FOREIGN PATENT DOCUMENTS

| | | | | |
|---|---|---|---|---|
| EP | 0896834 | A2 | 2/1999 | |
| GB | 1507722 | A * | 4/1978 | ............. C21C 7/076 |
| GB | 1597722 | | 4/1978 | |
| JP | S62-171744 | D3 | 7/1987 | |
| JP | 01-179730 | U1 | 12/1989 | |
| JP | H09-506035 | D4 | 6/1997 | |
| JP | 2007-105653 | D2 | 4/2007 | |

OTHER PUBLICATIONS

Takayuki Yamada, Japanese Patent Office, Japanese Patent Application No. 2013-558407, Office Action dated Dec. 1, 2015.
Office Action, Mexican Application No. MX/a/2013/009520 (English Translation).
Office Action, Japanese Application No. 2013-558407, dated Mar. 22, 2016, Examiner Yamada (English Translation).
Office Action, Brazilian Patent Application No. 11 2013 023 322-2, dated Jul. 8, 2019, Gilson Da Silva.

* cited by examiner

METHOD FOR GRANULATING OR AGGLOMERATING AND TOOL THEREFOR

The present invention relates to a method for granulating or agglomerating and to a tool and a device therefor.

Granulating and agglomerating are known from process engineering. When granulating, a granulated material, i.e. a granular and easily pourable solid, is produced from one or more ingredients. When agglomerating, the particle size range is shifted to larger sizes, so constituting the opposite of comminution.

It is known for granulating or agglomerating for the corresponding ingredients and any additives to be introduced into a mixer and mixed together with the aid of a stirring tool.

Stirring tools used for this frequently exhibit a plurality of arms which are mounted on a central shaft and extend radially outwards and are angled upwards or downwards at their radially outer ends.

However, it has been shown that the stirring time required to obtain a desired granulating or agglomerating result with these tools and these devices is extremely long. In addition, with the known tools it is only possible to obtain granulated materials with a granule size distribution in the range of from 0.1-2.0 mm or larger. The yield of granulated materials in the range of less than 1.0 mm is relatively low at 30-60%. For this reason, for fine granulated materials in the size range of from 0.1 to 0.8 mm for preference use is made of spray granulators which obtain a yield of almost 100%.

Therefore, starting from the prior art as described, the object of the present invention is to provide a granulating and/or agglomerating tool for a granulating and/or agglomerating device and a corresponding granulating and/or agglomerating device and a method for granulating or agglomerating with which the desired granulating or agglomerating result can be obtained very much faster and above all with a significantly finer granulated material with a significantly higher yield in the range of from 0.1 to 0.8 mm.

According to the invention, this object is achieved by a granulating and/or agglomerating tool for a granulating and/or agglomerating device in which the tool exhibits a fastening shaft and a substantially disk-shaped element with a diameter d which is fastened thereto, the disk-shaped element having an upper surface, a lower surface and a circumferential surface connecting the upper and the lower surface. Moreover, the circumferential surface has a plurality of essentially V-shaped grooves running parallel to the axis of the shaft.

Surprisingly, it has been shown that such a tool produces significantly better results particularly when granulating, and also when agglomerating.

As the present invention was developed essentially for granulating, in the following the invention is described solely with reference to granulating. However, it has been shown that advantages are also obtained when agglomerating so that it is expressly pointed out that the tool and the method can also be used for agglomerating.

In one particularly preferred form of embodiment the grooves exhibit a groove depth t, t being between 0.05 and 0.4 times, preferably between 0.1 and 0.3 times and best between 0.15 and 0.25 times the diameter d of the disk-shaped element. The grooves must firstly not be too deep in order to guarantee adequate movement of the material to be granulated in the radial direction outwards along the upper and lower surface of the disk-shaped element, and on the other hand must not be too small since the desired granulating effect essentially takes place inside the grooves or at the edges which are formed by the upper or lower surface and the groove walls. Thus, the grooves run from the upper surface to the lower surface of the disk-shaped element.

Therefore, the edges formed by the groove walls and the upper or lower surface of the disk-shaped element should be as sharp-edged as possible, i.e. the corner radius should be less than 1 mm.

In a further particularly preferred form of embodiment at least one groove wall is made at least in part of a harder material than the disk-shaped element. As already stated, the desired granulating effect is produced largely by the grooves, which can lead to increased wear of the groove walls and in particular of the edges formed by the groove walls and the upper and lower surface of the disk-shaped element. Therefore, provision is made for the groove wall to be made at least in part, best in a portion adjoining the circumferential surface, of a harder material. Thus, the disk-shaped element can be tipped for example with a hard metal alloy (carbide), a ceramic material or a hardened steel element.

Alternatively or in combination with this, the groove wall of the disk-shaped element exhibits a recess into which a wearing element, preferably of the harder material, is fitted. The elements fitted into the recess can be connected firmly or detachably with the disk-shaped element. When the wearing elements are worn, they can simply be changed.

Alternatively, the entire radially outer region of the disk-shaped elements comprising the grooves can be made of a harder material.

It has also been shown that the granulating effect can be boosted even further when the harder material or the wearing element protrudes beyond the upper surface and/or the lower surface and/or the circumferential surface by the distance a, as then the granulating effect is produced solely by the portion made of harder material. Here the distance a should be less than the thickness e of the disk-shaped element.

In addition, for many applications it can be advantageous when the groove wall exhibits at least two portions separated from one another made of a harder material than the disk-shaped element or two inserted wearing elements, best with the harder material or the wearing elements protruding beyond the upper surface and/or the lower surface in both portions.

Moreover, it has been shown that the granulating effect can be improved when the upper surface in a circular portion extending from the circumferential surface by the groove depth t in the direction of the shaft exhibits no element which protrudes axially upwards beyond the groove walls or beyond an element made of harder material fastened on or in the groove walls. Investigations with different tool geometries have shown that protrusions projecting axially upwards on the upper side of the disk-shaped element and not directly adjoining the groove walls lead to poorer contact between the material being granulated and the surface of the disk which essentially impairs the granulating effect.

Best, at least on the upper surface of the disk-shaped element in a circular portion extending from the circumferential surface by 0.35 times, or better by 0.45 times the diameter of the disk-shaped element in the direction of the shaft, there is no element—apart from the harder material which may be present—protruding beyond the upper surface of the disk-shaped element. Ideally only the fastening shaft protrudes beyond the upper surface of the disk-shaped element. The upper surface of the disk-shaped element is preferably undisturbed and as flat and smooth as possible.

Since as a rule the tool according to the invention cannot be mounted directly over the bottom of a container, it can be expedient for many applications when the lower surface exhibits at least one and preferably at least two swirl elements which protrude beyond the lower surface in an axial direction, the swirl elements preferably having the same angular spacing in the circumferential direction.

So for example, a swirl element could be fastened on each "web" formed between two neighbouring grooves of the disk-shaped element. Alternatively, it would also be possible to fasten corresponding swirl elements on just every second, third or fourth "web".

In a further particularly preferred form of embodiment provision is made for the grooves to be arranged equidistant from one another in the circumferential direction.

It has also been shown that advantageously the ratio of the groove width to the distance between the grooves in the circumferential direction is greater than 0.05, preferably between 0.1 and 5 and best between 0.3 and 2.

For many applications it can be advantageous when the tool exhibits two disk-shaped elements which are arranged on the fastening shaft spaced a distance from one another in the axial direction. Obviously, more than two disk-shaped elements can also be provided.

Basically, the tool according to the invention can be used in any container. The container axis can be arranged for example vertically, horizontally or inclined in relation to the vertical. Good granulating properties were observed with vertical containers in which the tool rotates concentrically about its own axis in a fixed location or rotates eccentrically in relation to the middle of the container around the centre of the mixer and around its own axis.

However, the tool according to the invention is best used in a granulating and/or agglomerating device with a rotatable container, the granulating and/or agglomerating tool according to the invention being arranged in the rotatable container and best not rotated with the container. In other words the container rotates while the fastening shaft of the granulating tool remains essentially in the same location. However, the granulating tool is able to rotate about the axis of the shaft.

Here, the axis of rotation of the container and the axis of the shaft are preferably arranged parallel to one another, best with the axis of rotation of the container and the axis of the shaft spaced a distance from one another.

Furthermore, it is advantageous when the axis of rotation of the container is inclined slightly in relation to the vertical. Here, angles of inclination of between 5° and 30° have proved to be particularly preferred.

Furthermore, the present invention also relates to a method for granulating or agglomerating in which the ingredients to be granulated or agglomerated are introduced into a container and mixed with a tool, using the granulating and/or agglomerating device as described.

Further advantages, features and possible applications will become clear from the present description of preferred forms of embodiment.

Figure 1:
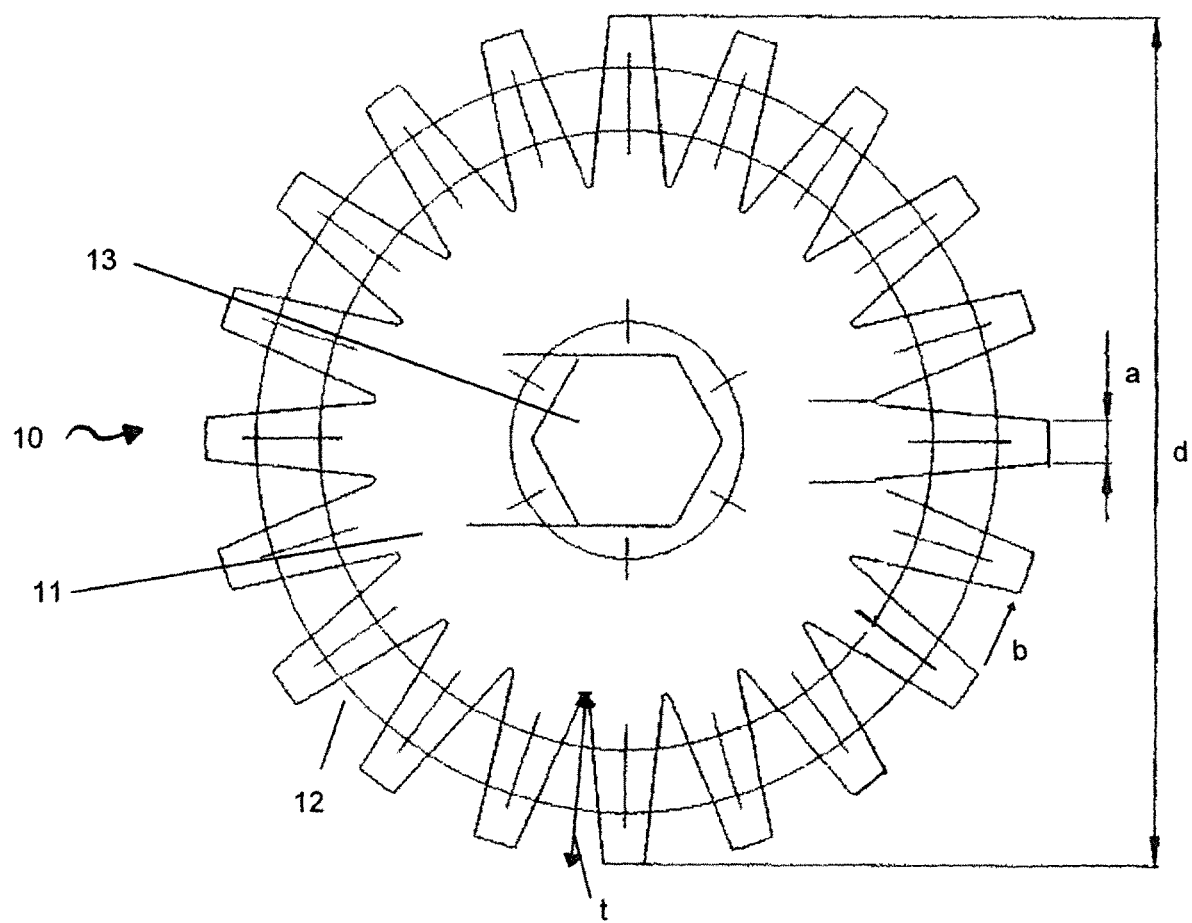
FIG. 1 shows a first form of embodiment of the granulating tool according to the invention.

FIG. 1 shows a first form of embodiment of the invention in a plan view. The tool 10 consists of a disk-shaped element 11 which in the centre exhibits an opening 13 with which the disk-shaped element 11 can be attached to a fastening shaft (not shown).

The disk-shaped element 11 has an upper surface which can be seen in FIG. 1, a lower surface which faces the plane of the paper, and a circumferential surface which connects the upper surface and the lower surface. The circumferential surface exhibits a large number of V-shaped grooves 12 with a groove depth t.

The groove has a width b and the distance from groove to groove is a. The disk-shaped element 11 has a diameter d. The groove walls are formed so as to be sharp-edged, i.e. the junction areas between the upper and lower surface and the groove walls are not chamfered, but have a very small radius of curvature. Neighbouring grooves are each spaced 18° from one another in the circumferential direction.

Figure 2:
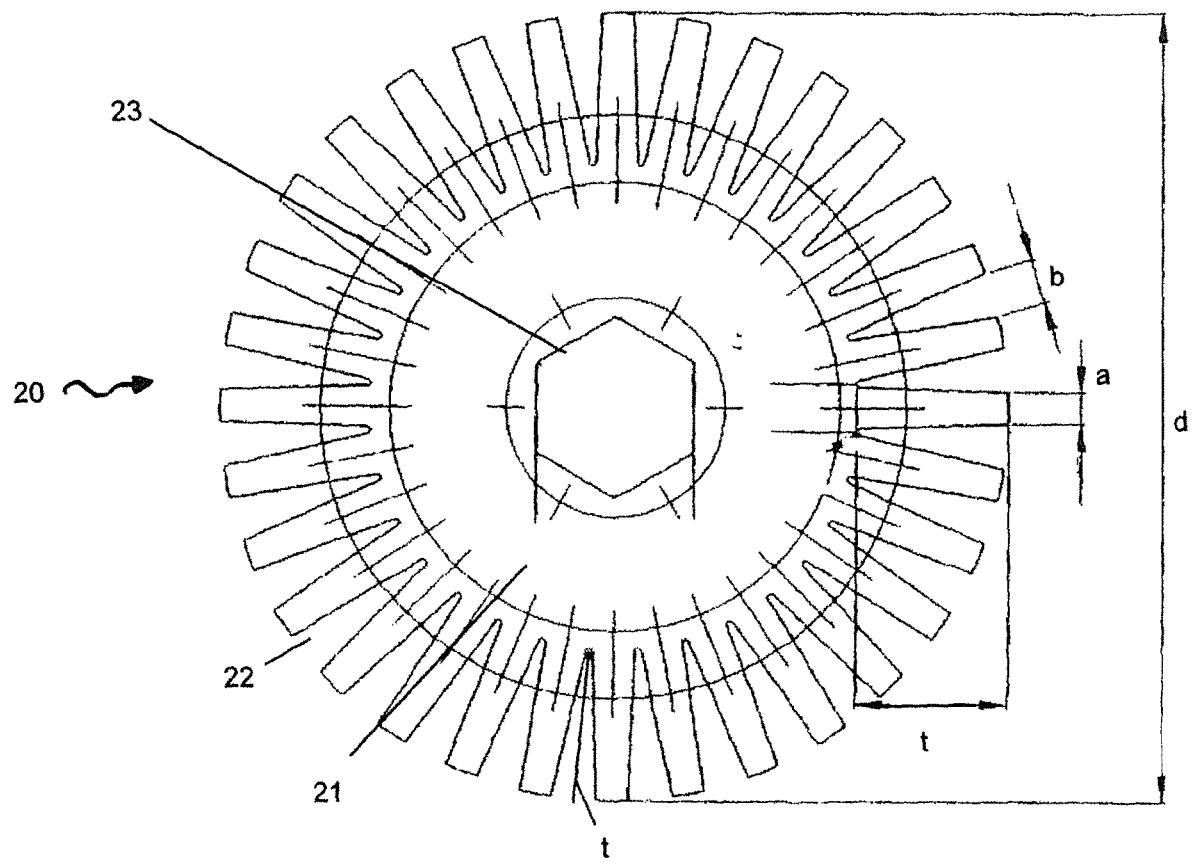
FIG. 2 shows a second form of embodiment of the granulating tool according to the invention.

FIG. 2 shows a second form of embodiment of the invention in which the tool 20 also exhibits an opening 23 which is used to fasten the tool to the fastening shaft. The second form of embodiment differs from the first form of embodiment essentially in that significantly more grooves 22 are provided. Consequently, the grooves are spaced by an angle of 11.25° from one another in the circumferential direction.

Figure 3:
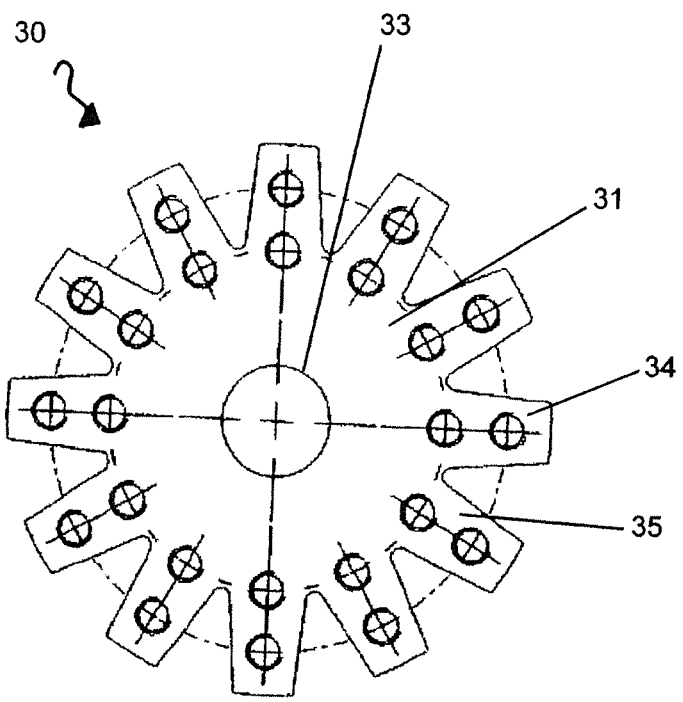
FIG. 3 shows a third form of embodiment of the granulating tool according to the invention.

FIG. 3 shows a third form of embodiment of the invention. The tool 30 consists of a disk-shaped element. Here, again, a central opening 33 is provided for fastening to the fastening shaft (not shown).

In this form of embodiment there are also two circles of threaded bores 34 and 35 in which one or more swirl elements can be fastened on the lower surface of the tool 30.

Figure 4:
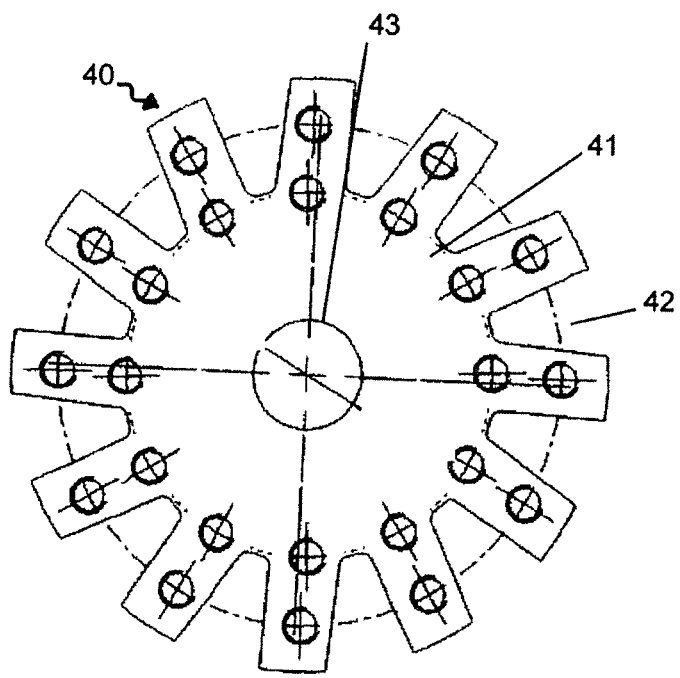
FIG. 4 shows a fourth form of embodiment of the granulating tool according to the invention.

FIG. 4 shows a fourth form of embodiment of the invention in which the grooves 42 are not formed symmetrically in cross-section. In addition, the groove base exhibits a plateau.

Figure 5:
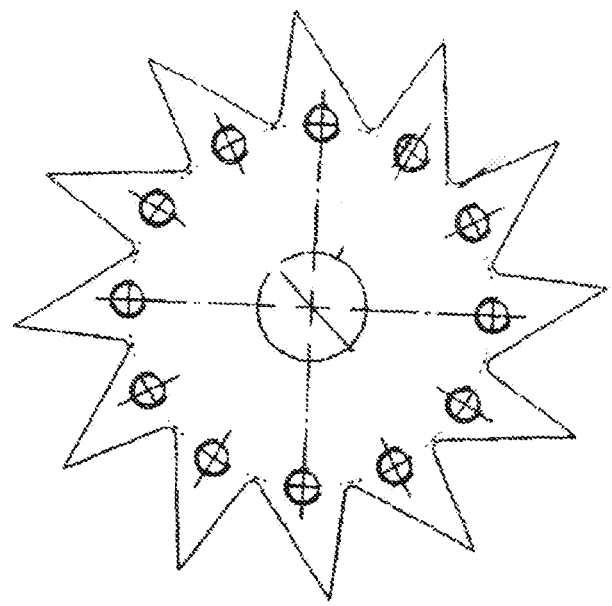
FIG. 5 shows a fifth form of embodiment of the granulating tool according to the invention.

FIG. 5 shows a fifth form of embodiment of the invention in which the groove width is so large that the distance between two neighbouring grooves becomes minimal.

Figure 6:
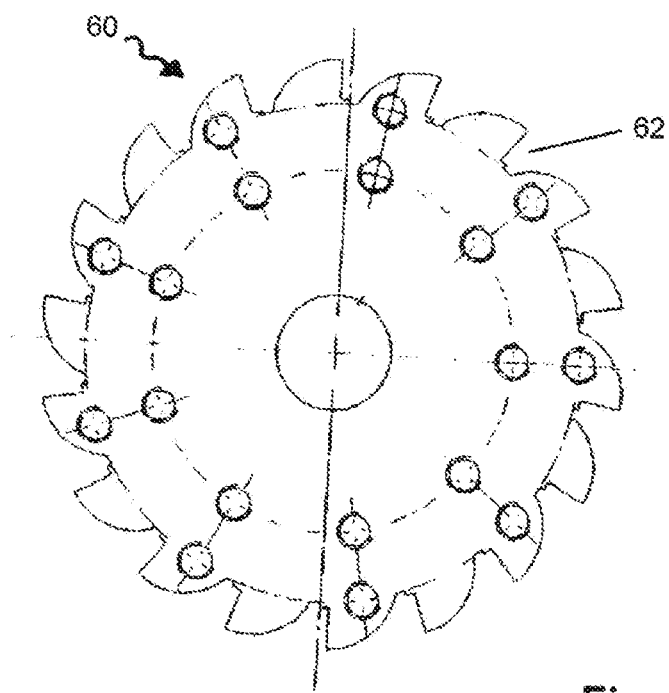
FIG. 6 shows a sixth form of embodiment of the granulating tool according to the invention.

In the case of the form of embodiment of the tool 60 shown in FIG. 6, the groove 62 exhibits one essentially flat groove wall and one convexly curved groove wall.

Figure 7:
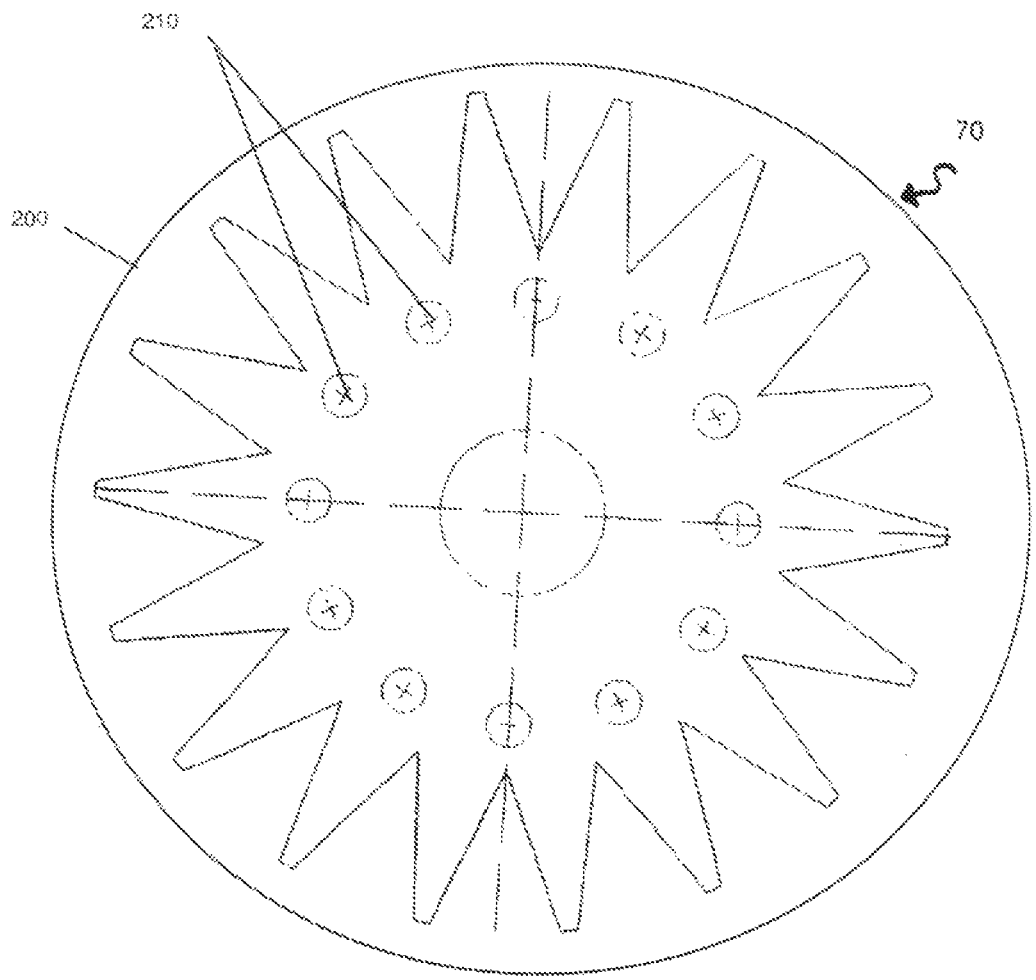
FIG. 7 shows a seventh form of embodiment of the granulating tool according to the invention.
Figure 8:
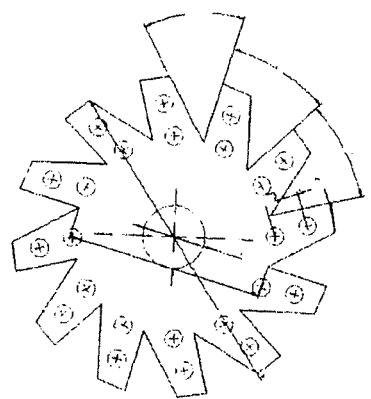
FIG. 8 shows an eighth form of embodiment of the granulating tool according to the invention.
Figure 9:
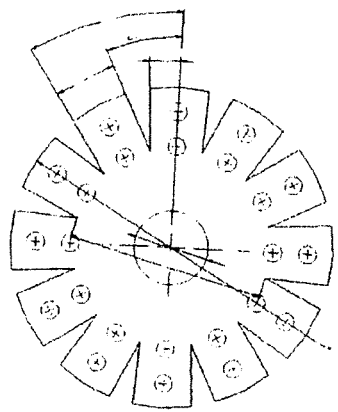
FIG. 9 shows a ninth form of embodiment of the granulating tool according to the invention.
Figure 10:
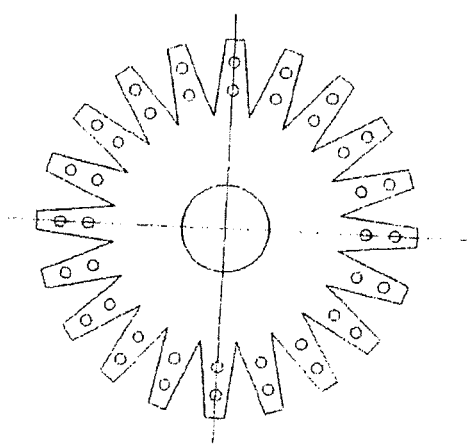
FIG. 10 shows a tenth form of embodiment of the granulating tool according to the invention.
Figure 11:
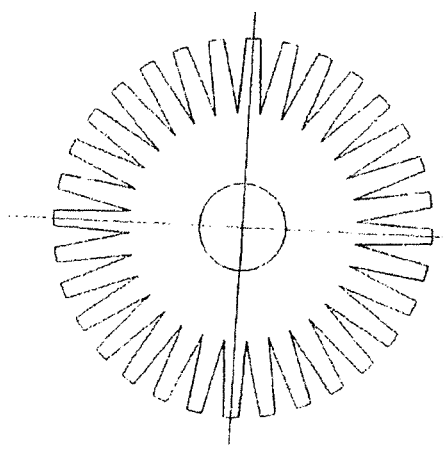
FIG. 11 shows an eleventh form of embodiment of the granulating tool according to the invention.

FIG. 7 shows a seventh form of embodiment of a tool 70 according to the invention positioned in a container 200 and bearing swirl elements 210 on its under surface.

FIGS. 8 to 11 show eighth to eleventh forms of embodiment of the invention. The forms of embodiment differ through different groove geometries and different groove widths and depths.

Figure 12:
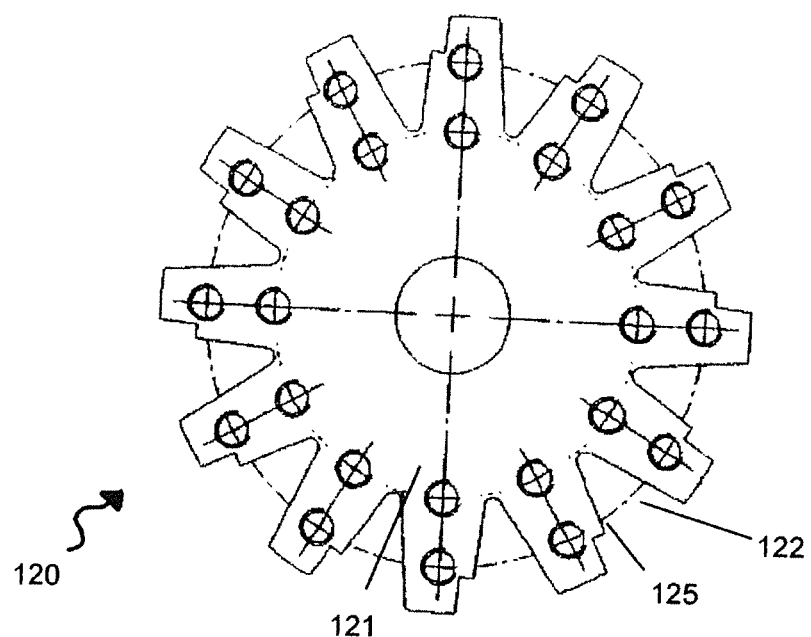
FIG. 12 shows a twelfth form of embodiment of the granulating tool according to the invention.

FIG. 12 shows a further preferred form of embodiment. The tool 120 exhibits a disk-shaped element 121 with a large number of grooves 122. Each groove 122 exhibits on one groove wall a recess 125 which is provided for reception of a material which is preferably harder than the material of the disk-shaped element 121. A hard metal alloy (carbide) for example can be inserted here.

The inserted hard metal alloy (carbide) can protrude both beyond the upper surface and beyond the lower surface in the axial direction and beyond the circumferential surface.

Figure 13:
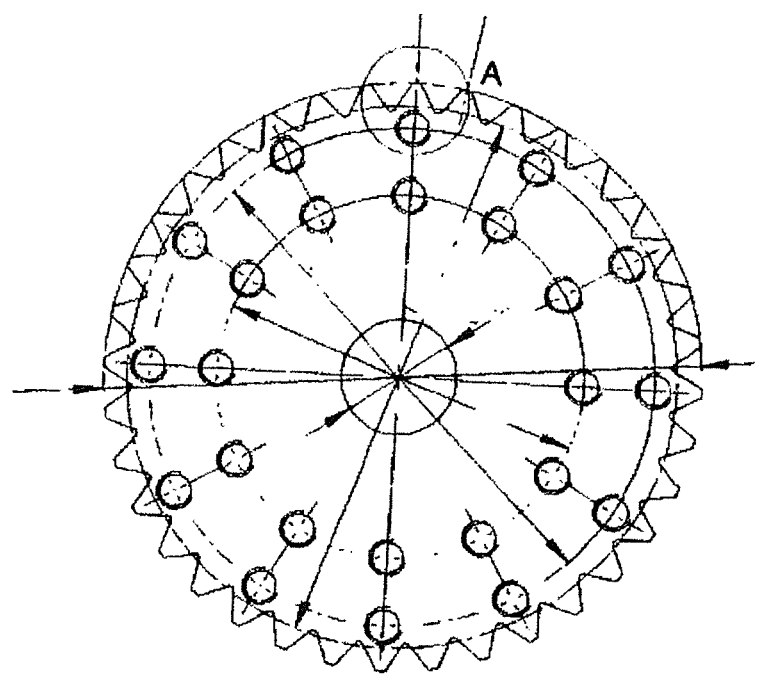
FIG. 13 shows a thirteenth form of embodiment of the granulating tool according to the invention.

FIG. 13 shows a thirteenth form of embodiment of the invention in which the groove depth is very small.

Figure 14:
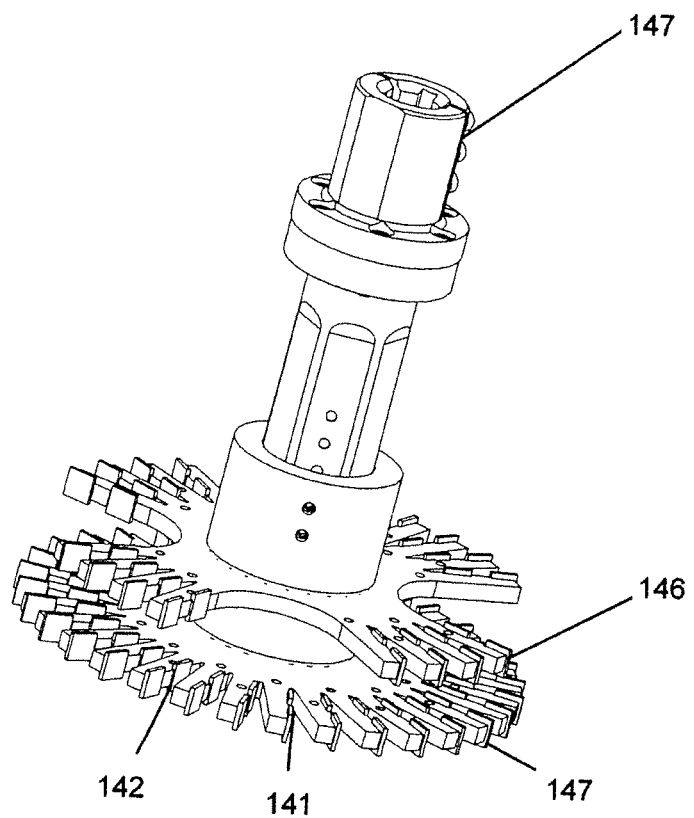
FIGS. 14 to 16 show a fourteenth form of embodiment of the invention.
Figure 15:
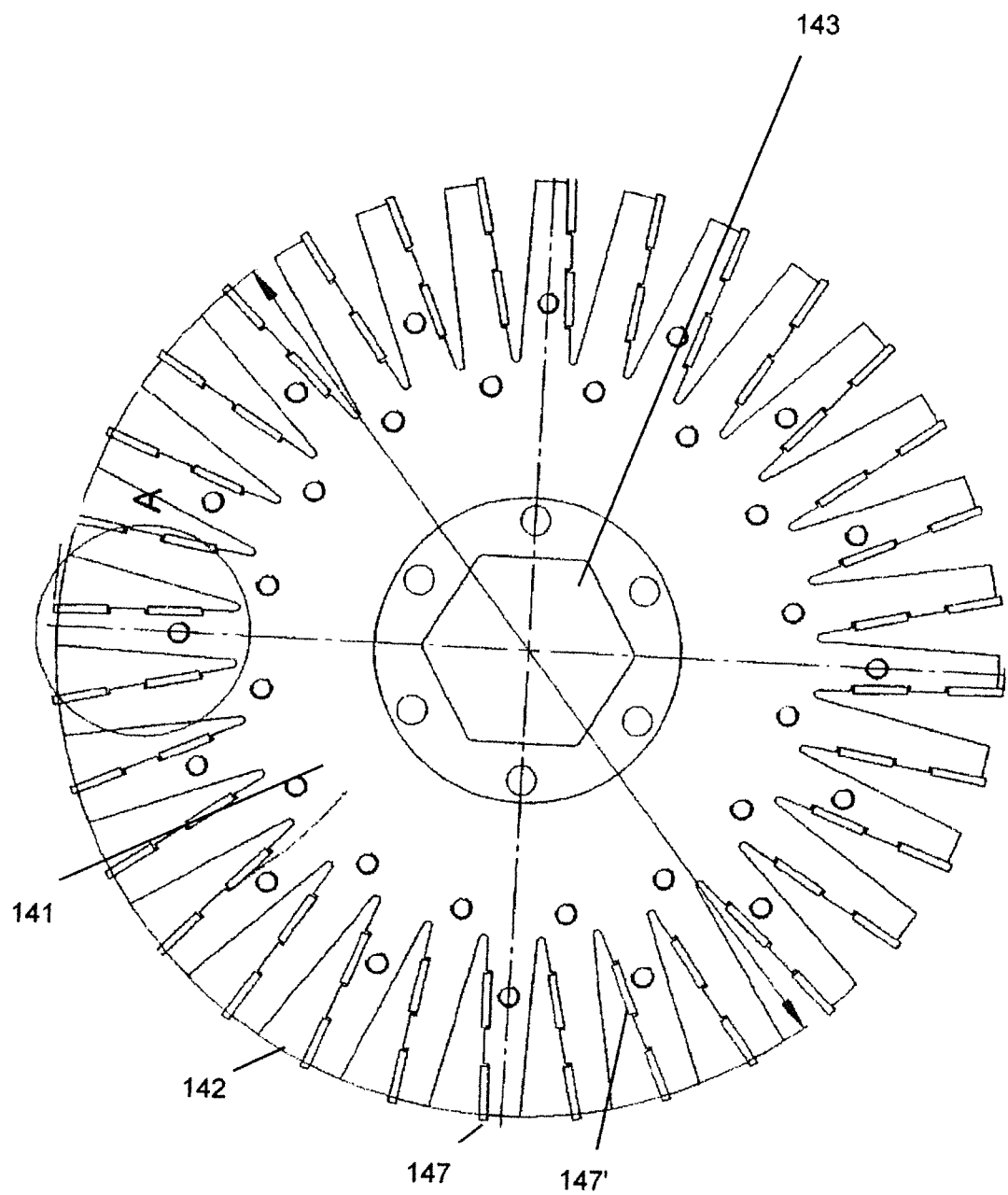
Figure 16:
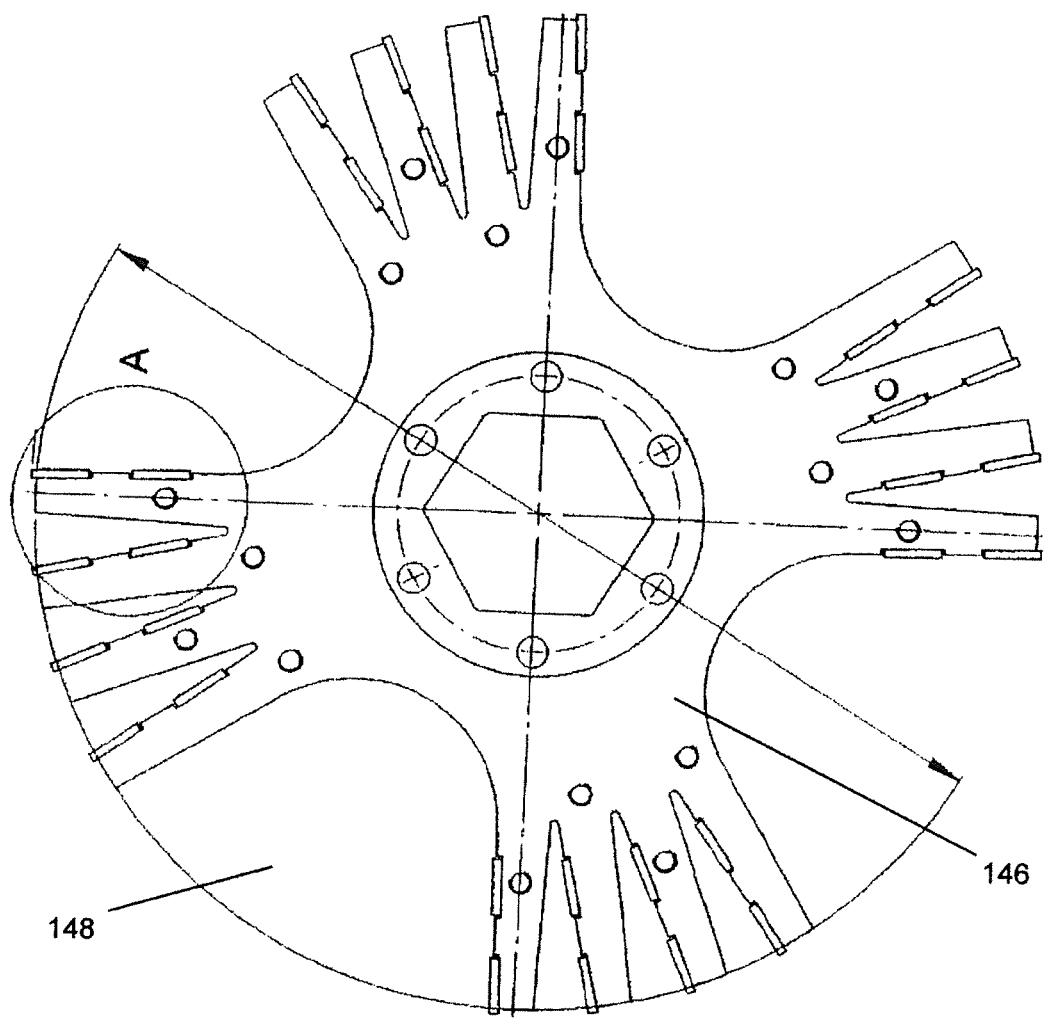

FIGS. 14 to 16 show a fourteenth form of embodiment of the invention. FIG. 14 shows a perspective view of the tool 140. The tool 140 exhibits two disk-shaped elements 141 and 146 both of which are arranged on the fastening shaft 147. They are spaced a distance from one another in the axial direction. Both disk-shaped elements 141, 146 exhibit grooves 142. In each case, one groove wall of each groove 142 exhibits two portions made of a harder material, e.g. a hard metal alloy (carbide). These hard metal alloy (carbide) plates 147 protrude beyond the upper, the lower and the circumferential surfaces of the disk-shaped element in the axial and the radial direction. In addition, the upper disk-shaped element 146 exhibits four U-shaped openings 148 through which the material to be granulated can flow to the lower disk-shaped element 141.

FIG. 15 shows a plan view of the lower disk-shaped element 141. It can be seen that the hard metal alloy (carbide) inserts 147 and 147' are arranged in corresponding recesses in the groove wall.

The upper disk-shaped element 146 shown in FIG. 16 exhibits corresponding U-shaped openings 148 through which the material can flow from above through the opening 148 to the lower disk-shaped element 141.

The invention claimed is:

1. Method for agglomerating, in which the ingredients to be agglomerated are introduced into a container having an axis of rotation and mixed with a tool to agglomerate the ingredients, characterised in that an agglomerating device is used, whereas said agglomerating device includes a container and an agglomerating tool arranged in the container, the agglomerating tool having a fastening shaft and a substantially disk-shaped element with a diameter d which is fastened thereto and has an upper surface, a lower surface and a circumferential surface connecting the upper and the lower surface, the circumferential surface exhibiting a plurality of essentially V-shaped grooves having walls running parallel to the axis of the shaft, the lower surface of the tool having at least one swirl element which protrudes beyond the lower surface in the axial direction.

2. Method according to claim 1 wherein the lower surface of the tool has at least two swirl elements which protrude beyond the lower surface in the axial direction.

3. Method according to claim 2 wherein each of the at least two swirl elements had the same angular spacing in the circumferential direction from each adjacent swirl element.

4. Method according to claim 1, characterised in that the grooves exhibit a groove depth t, t being between 0.05 and 0.4 times the diameter d.

5. Method according to claim 4, characterised in that the grooves exhibit a groove depth between 0.1 and 0.3 times the diameter d.

6. Method according to claim 4, characterised in that the grooves exhibit a groove depth between 0.15 and 0.25 times the diameter d.

7. Method according to claim 1, characterised in that at least one groove wall at least in part is made of a harder material than the disk-shaped element.

8. Method according to claim 1, characterised in that provided in the groove wall of the disk-shaped element there is a recess into which a wearing element is fitted, the wearing element being made of a harder material than the disk-shaped element.

9. Method according to claim 8, characterised in that the wearing element protrudes beyond the upper surface and/or the lower surface and/or the circumferential surface by a distance a, the distance a being less than the thickness e of the disk-shaped element.

10. Method according to claim 9, characterised in that at least one groove wall exhibits at least two recesses which are separated from one another and into which in each case the wearing element is fitted, the wearing material protruding beyond the upper surface and/or the lower surface.

11. Method according to claim 1, characterised in that the upper surface in a circular portion extending from the circumferential surface by at least the groove depth tin the direction of the shaft, exhibits no element extending axially beyond the groove walls or a wearing element fastened on or in the groove walls.

12. Method according to claim 1, characterised in that the grooves are arranged equidistant from one another in the circumferential direction, the ratio of the groove width to the distance between the grooves in the circumferential direction being greater than 0.05.

13. Method according to claim 1, characterised in that at least two disk-shaped elements are provided, spaced a distance from one another in the axial direction.

14. Method according to claim 1, characterised in that the axis of rotation of the container and the axis of the shaft are arranged parallel to one another, the axis of rotation of the container and the axis of the shaft being spaced a distance from one another.

15. Method according to claim 14, characterised in that the container is rotatable, the axis of the shaft of the agglomerating tool being fixed in one location.

16. Method according to claim 14, characterized in that the container is rotatable, with the axis of the shaft of the agglomerating tool being rotatable about its shaft axis.

17. Method according to claim 1, wherein the ratio of the groove width to the distance between the grooves in the circumference direction is between 0.1 and 5 times the diameter d.

18. Method according to claim 1, wherein the ratio of the groove width to the distance between the grooves in the circumference direction is between 0.3 and 2.

19. Method for agglomerating, the method comprising:
   a) introducing ingredients that can be agglomerated into a container having an axis of rotation
   b) mixing the ingredients that can be agglomerated with a tool, and
   c) agglomerating the ingredients;
   characterised in that an agglomerating device is used, whereas said agglomerating device includes a container and an agglomerating tool arranged in the container, the agglomerating tool having a fastening shaft and a substantially disk-shaped element with a diameter d which is fastened thereto and has an upper surface, a lower surface and a circumferential surface connecting the upper and the lower surface, the circumferential surface exhibiting a plurality of essentially V-shaped grooves having walls running parallel to the axis of the shaft, the lower surface of the tool having at least one swirl element which protrudes beyond the lower surface in the axial direction.

\* \* \* \* \*

UNITED STATES PATENT AND TRADEMARK OFFICE
CERTIFICATE OF CORRECTION

PATENT NO. : 11,014,055 B2
APPLICATION NO. : 14/004700
DATED : May 25, 2021
INVENTOR(S) : Gerl et al.

Page 1 of 1

It is certified that error appears in the above-identified patent and that said Letters Patent is hereby corrected as shown below:

In the Claims

Column 6, Line 24, Claim 11, change "tin" to -- t in --

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*